US012689393B1

(12) United States Patent
Bonen

(10) Patent No.: US 12,689,393 B1
(45) Date of Patent: Jul. 21, 2026

(54) FAST DIPLEXER SWITCHING

(71) Applicant: Harmonic, Inc., San Jose, CA (US)

(72) Inventor: Adi Bonen, North York (CA)

(73) Assignee: Harmonic, Inc., San Jose, CA (US)

( * ) Notice: Subject to any disclaimer, the term of this patent is extended or adjusted under 35 U.S.C. 154(b) by 294 days.

(21) Appl. No.: 18/379,147

(22) Filed: Oct. 11, 2023

Related U.S. Application Data

(60) Provisional application No. 63/416,456, filed on Oct. 14, 2022.

(51) Int. Cl.
*H04B 1/00* (2006.01)
*H04W 72/0453* (2023.01)

(52) U.S. Cl.
CPC ...... *H04B 1/0057* (2013.01); *H04W 72/0453* (2013.01)

(58) Field of Classification Search
CPC .......................... H04B 1/0057; H04W 72/0453
See application file for complete search history.

(56) References Cited

U.S. PATENT DOCUMENTS

| | | | |
|---|---|---|---|
| 9,130,769 | B2 | 9/2015 | Chapman |
| 10,230,519 | B2 | 3/2019 | Chapman et al. |
| 10,749,551 | B1 * | 8/2020 | Finkelstein ............ H04B 1/405 |
| 11,070,292 | B2 | 7/2021 | Mutalik et al. |
| 11,569,973 | B1 | 1/2023 | Hamzeh et al. |
| 2017/0026060 | A1 * | 1/2017 | Thompson ........... H04B 1/0057 |
| 2019/0123818 | A1 * | 4/2019 | Zhang ................ H04B 10/2575 |
| 2019/0181907 | A1 * | 6/2019 | Pfann ..................... H03H 9/547 |
| 2021/0160454 | A1 * | 5/2021 | Cloonan ................ H04N 7/104 |
| 2021/0250196 | A1 * | 8/2021 | Das .................... H04W 72/0453 |
| 2022/0069969 | A1 * | 3/2022 | Young ................ H04L 12/2869 |
| 2024/0063830 | A1 * | 2/2024 | Klies ................... H04W 74/002 |

* cited by examiner

*Primary Examiner* — Yu-Wen Chang
(74) *Attorney, Agent, or Firm* — Brokaw Patent Law, PC; Christopher J. Brokaw

(57) ABSTRACT

Dynamically adjusting how a frequency spectrum is allocated between upstream and downstream communications on an access network. A device receives, over the access network from an upstream direction, an instruction to dynamically adopt a new active spectrum configuration from a set of preestablished spectrum configurations. Each of the preestablished spectrum configurations allocates the available frequency spectrum differently between upstream traffic and downstream traffic. The device processes the instruction by selecting one or more switchable diplexers or other frequency filters to adopt the new spectrum configuration. Upon adopting the new spectrum configuration, the device ceases to use a prior spectrum configuration and thereafter uses the frequency spectrum in accordance with the new active spectrum configuration.

16 Claims, 3 Drawing Sheets

110 —
A DEVICE RECEIVES AN INSTRUCTION TO DYNAMICALLY ADOPT A NEW ACTIVE SPECTRUM CONFIGURATION

120 —
THE DEVICE PROCESS THE INSTRUCTION BY SELECTING ONE OR MORE SWITCHABLE DIPLEXERS OR OTHER FREQUENCY FILTERS TO ADOPT THE NEW ACTIVE SPECTRUM CONFIGURATION

130 —
THE DEVICE CEASES TO USE A PRIOR SPECTRUM CONFIGURATION AND HENCEFORTH USES THE NEW ACTIVE SPECTRUM CONFIGURATION

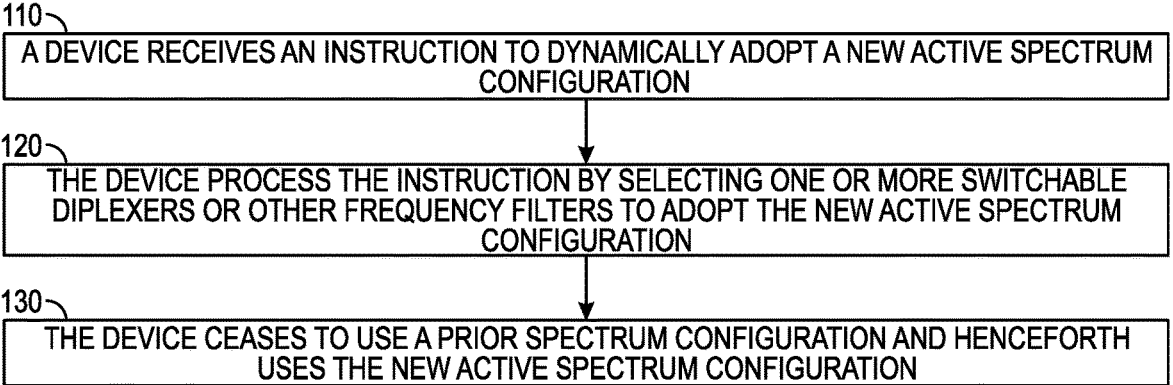

110 — A DEVICE RECEIVES AN INSTRUCTION TO DYNAMICALLY ADOPT A NEW ACTIVE SPECTRUM CONFIGURATION

120 — THE DEVICE PROCESS THE INSTRUCTION BY SELECTING ONE OR MORE SWITCHABLE DIPLEXERS OR OTHER FREQUENCY FILTERS TO ADOPT THE NEW ACTIVE SPECTRUM CONFIGURATION

130 — THE DEVICE CEASES TO USE A PRIOR SPECTRUM CONFIGURATION AND HENCEFORTH USES THE NEW ACTIVE SPECTRUM CONFIGURATION

FIG. 1

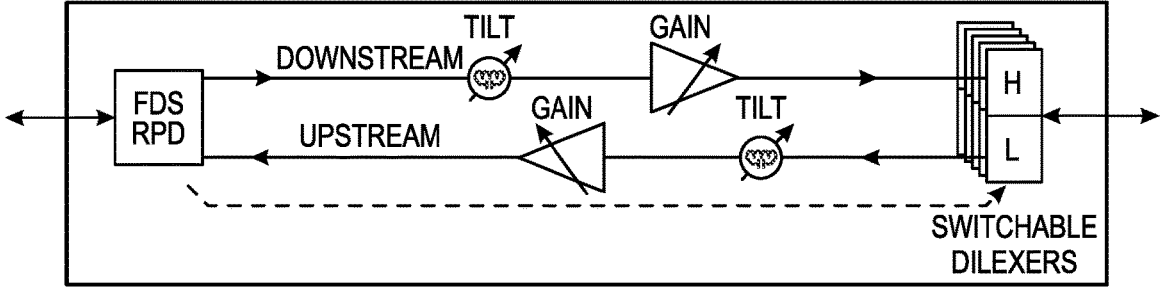

FIG. 2

FAST DIPLEXER SWITCHING

CLAIM OF PRIORITY

This application claims priority to U.S. provisional patent application Ser. No. 63/416,456, filed Oct. 14, 2022, invented by Adi Bonen, entitled "Fast Diplexer Switching," the entire contents of which are hereby incorporated by reference for all purposes as if fully set forth herein.

FIELD OF THE INVENTION

Embodiments of the invention relate to allocating a frequency spectrum between upstream and downstream communications on an access network.

BACKGROUND

Data Over Cable Service Interface Specification (DOCSIS) is a widely-employed standard in the cable industry that specifies how data is transmitted over a cable network. Version 4.0 of the DOCSIS standard supports sending and receiving data transmitted at same frequency at same time over the same network cable, which is a concept known in the art as full duplex transmission (FDX). To support full duplex transmission or FDX, the DOCSIS version 4.0 standard assumes that only nodes and no amplifiers are deployed in the field. To adjust the currently deployed infrastructure deployed in the field to accommodate that assumption would require a substantial investment by the cable network operator. Consequently, many cable network operators choose to not support full duplex transmission under DOCSIS 4.0 to avoid making the costly investment that would be required to add the additional nodes throughout their network.

Frequency duplexing division (FDD) is another specification defined by DOCSIS version 4.0. FDD allocates an additional amount of frequency spectrum to both upstream communications and downstream communications. However, FDD does not support full duplex transmission; instead, FDD supports one range of frequencies for upstream communications and a separate range of frequencies for downstream communications. Cable networks typically operate in this fashion, i.e., a separate range of frequencies allocated to upstream and downstream communications; however, DOCSIS version 4.0 FDD had an advantage over such traditional approaches in that a greater amount of the frequency spectrum was made available to both upstream communications and to downstream communications.

Unlike FDX under DOCSIS version 4.0, FDD was designed to operate with both nodes and amplifiers. However, like FDX, FDD also requires a substantial plant upgrade, including replacing existing amplifiers and taps. Without a significant update in the cable plant to increase the total available spectrum, FDD requires a significant sacrifice to the portion of the spectrum available for downstream communications to achieve any benefit in the upstream direction. Enacting a change in the allocation of the frequency spectrum between downstream and upstream communications in the FDD specification is a manual endeavor that is costly and is typically considered a once in a lifetime event.

Both FDX and FDD have drawbacks with respect to the amount of time and cost necessary to implement and upgrade the physical network structure, such as nodes and amplifiers, to be capable of supporting the FDX and FDD functionality.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a flowchart depicting the steps of dynamically adjusting how a frequency spectrum is allocated between upstream and downstream communications on an access network in accordance with an embodiment of the invention;

FIG. 2 is a block diagram of a hybrid fiber-coaxial (HFC) node upon which an embodiment of the invention may be practiced;

DETAILED DESCRIPTION

Figure 3:
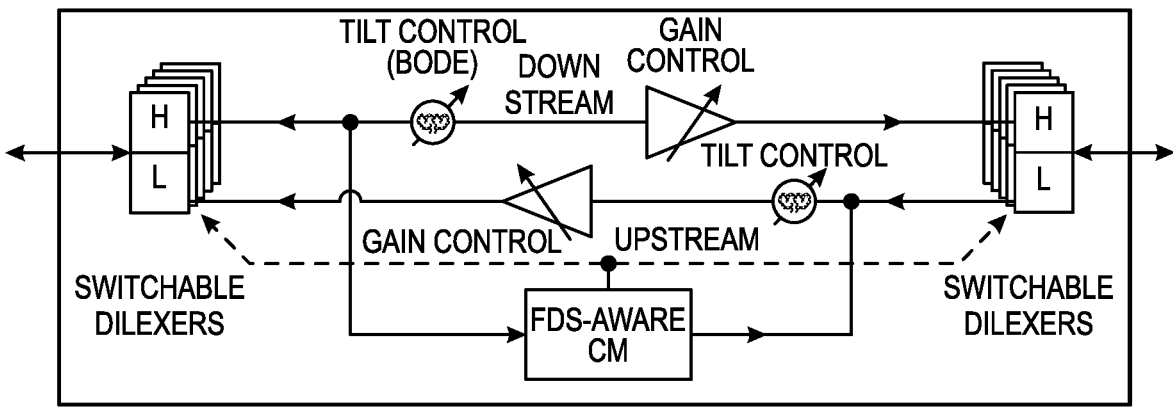
FIG. 3 is a block diagram of a HFC amplifier upon which an embodiment of the invention may be practiced.

Embodiments are directed towards dynamically adjusting how a frequency spectrum is allocated between upstream and downstream communications on an access network. In the following description, for the purposes of providing a detailed explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention enable access network operators to realize benefits and improved functionality without requiring repeated costly upgrades in their existing cable plant. Embodiments of the invention, termed fast diplexer switching (FDS), can realize both high downstream and high upstream rates when needed, without requiring access network operators to undesirably expend time and financial resources to upgrade their existing cable plant to reestablish different downstream vs. upstream spectrum allocation.

FDS operates by utilizing a portion of the physical hardware of access network hardware to dynamically adjust how a frequency spectrum is allocated between upstream communications and downstream communications on the access network. When more bandwidth is needed in the upstream or the downstream direction, how the frequency spectrum is allocated may be dynamically adjusted. Such an adjustment may be made by adopting a new spectrum configuration, which is a configuration that defines what portion of the frequency spectrum is used in the access network for upstream communications and what portion of the frequency spectrum is used in the access network for downstream communications.

Those in the art understand what is meant by upstream communications and downstream communications on the access network. The usage of the terms upstream and downstream herein is consistent with well-known industry practice. For those unfamiliar, upstream communications are those communications sent in the direction from the subscriber's customer premises equipment (CPE) to the access network operator's centralized equipment, such as a Cable Modem Termination System (CMTS), leading towards the Internet backbone. Downstream communications are those communications sent in the opposite direction of upstream communications, i.e., in the direction from the access network operator's centralized equipment (e.g., (CMTS)) to a customer's CPE).

Embodiments of the invention may operate on a variety of different types of access networks, such as a cable network, a wireless network, a cellular communications network. For purposes of providing a concrete example, many examples will be discussed herein with reference to the access network being a cable network, although embodiments are not limited to any particular type of access network, as embodiments may be implemented in any network capable of using frequency duplexing division.

FDS of an embodiment can treat each node port of a device as a separate 1:1 segment, where the frequency spectrum allocation is independently set according to the rate demands of devices connected to that port. In embodiments involving Devices having a plurality of independently set ports, the downstream and upstream resources may be shared among its ports.

FIG. 1 is a flowchart depicting the steps of dynamically adjusting how a frequency spectrum is allocated between upstream and downstream communications on an access network in accordance with an embodiment of the invention. In step 110, a device on the access network receives an instruction to dynamically adopt a new active spectrum configuration different from what the device is currently using. The device receiving the instruction in step 110 may be one of a variety of different types of devices, such as without limitation a cable modem, a wireless modem, an amplifier, a Remote PHY device (RPD), a hybrid fiber-coaxial (HFC) node, a fixed wireless access point, a cellular base station, a wireless relay, and a Cable Modem Termination System (CMTS). Specific examples of how the steps of FIG. 1 may be performed in different types of devices of an access network will be discussed below with reference to FIGS. 2-4.

The instruction of step 110 to dynamically adopt a new active spectrum configuration different from what the device is currently using may be conveyed by identifying the new active spectrum configuration from a set of preestablished spectrum configurations, each of which allocates the available frequency spectrum differently between upstream traffic and downstream traffic. An example of a set of preestablished spectrum configurations will be discussed in greater detail below with references to FIG.

The instruction of step 110 may be initiated by an entity responsible for overseeing operations across the access network. Such an entity may detect that additional bandwidth may be needed in either the upstream or the downstream direction across the access network, and in response, may instruct devices on the access network to adopt a new active spectrum configuration which better suits the present needs of the access network.

For example, in an embodiment implemented on a cable network, the entity sending the instruction of step 110 to a device to dynamically adopt a new active spectrum configuration may be a software-implemented Cable Modem Termination System (CMTS), such as CableOS software available from Harmonic, Inc. of San Jose, California. The CMTS may measure and monitor downstream and upstream usage across the cable network and determine an optimal usage of the frequency spectrum between downstream and upstream communications. If, at some later point in time, the needs of the cable network change, then the CMTS may determine a new optimal usage of the frequency spectrum between downstream and upstream communications. Anytime that an optimal usage of the frequency spectrum between downstream and upstream communications changes as determined by the CMTS, the CMTS may send an instruction to one or more devices in the performance of step 110.

In step 120, the device receiving the instruction of step 110 processes the instruction by selecting one or more switchable diplexers or other frequency filters to adopt the new spectrum configuration specified by the instruction. The use of switchable diplexers or other frequency filters allows for the device to switch rapidly and automatically select a new active spectrum configuration to be adopted for use by the device from a set of preestablished spectrum configurations.

Thereafter, in step 130, upon adopting the new spectrum configuration identified by the instruction of step 110, the device ceases to use its prior spectrum configuration and henceforth uses the frequency spectrum in accordance with the newly adopted and active spectrum configuration. In an embodiment of the invention, the change in frequency allocation may result in some channels becoming active, requiring the device to also reestablish their operation, and some channels becoming inactive, requiring the device to suspend their operation.

Embodiments may vary with respect to the time it takes for a device to perform the steps of 120 and 130. For example, a device may be able to adopt and use a new spectrum configuration in a matter of tens of millisecond, while another device may adopt and use the new spectrum configuration in about a second. A device can be designed such that the time it takes for the device to perform the steps of 120 and 130 is suitable for the reaction time required in providing a new allocation of downstream vs. upstream data rates. For example, fast enough to react to a speed test performed over the communication link. Thus, embodiments of the invention thus provide great benefit even for demands on an access network that need not persist for long periods, as the steps of FIG. 1 may be performed in response to a speed test performed on the access network, in either the upstream or the downstream direction.

In an embodiment, the entity sending the instruction of step 110 may also specify a scheduled target time for when the new spectrum allocation needs to be applied, and the device receiving the instruction performs the steps of 120 and 130 at the designated time. This allows multiple devices to perform the operation asynchronously even when the time that it takes for different device to perform the steps of 120 and 130 is not the same.

FIG. 2 is a block diagram of a HFC node upon which an embodiment of the invention may be practiced. As shown in FIG. 2, the HFC node comprises a bank of switchable diplexers. The bank of switchable diplexers may be used to select and adopt a new spectrum configuration from a set of preestablished spectrum configurations. In other embodiments not shown in FIG. 2, frequency filters may be used to perform the function of the bank of switchable diplexers. After the bank of switchable diplexers or other frequency filters adopts a new spectrum configuration for the HFC node, the HFC node uses the frequency spectrum in accordance with the new active spectrum configuration by communicating with one or more downstream devices, such as a customer's customer premises equipment (CPE), using a set of downstream and upstream channels suitable to the new spectrum configuration.

The HFC node depicted in FIG. 2 is similar to a traditional HFC node but for the bank of switchable diplexers, as traditional HFC nodes possess fixed-split diplexers. In addition, a Remote PHY device (RPD) may be used to control the diplexer switching required in the performance of step 120, and thus, is involved in selecting the switchable diplexer. The RPD may be instructed by an entity upstream, such as a CMTS. The HFC node of an embodiment may have several southbound (downstream) ports, each of which has its own set of switchable diplexers that may be used to select a particular active spectrum configuration for that port.

To illustrate another example, FIG. 3 is a block diagram of a HFC amplifier upon which an embodiment of the invention may be practiced. As shown in FIG. 3, the HFC amplifier comprises a plurality of banks of switchable diplexers, which may be used to select and adopt a new spectrum configuration from a set of preestablished spectrum configurations. In other embodiments not shown in FIG. 3, frequency filters may be used to perform the function of the bank of switchable diplexers. After the bank of switchable diplexers or other frequency filters adopts a new spectrum configuration for the HFC amplifier, the HFC amplifier uses the frequency spectrum in accordance with the new active spectrum configuration by propagating an amplified version of upstream traffic and downstream traffic.

The HFC amplifier of an embodiment shown in FIG. 3 is similar to a traditional HFC amplifier but for the bank of switchable diplexers, as traditional HFC amplifiers possess fixed-split diplexers. In addition, as shown in FIG. 3, an embedded FDS aware cable modem (CM) may be employed to receive the instruction to dynamically adopt a new active spectrum configuration and to control the diplexer switching in both northbound and southbound ports required in the performance of step 120. The FDS aware cable modem (CM) of FIG. 3 may be instructed by an entity upstream, such as a CMTS. The FDS aware cable modem (CM) of FIG. 3 receives the downstream signal passing southbound through the amplifier and its upstream transmissions are combined with the upstream signals passing northbound through the amplifier. The HFC amplifier of an embodiment may have several southbound (towards CPE) ports, each of which has its own set of switchable diplexers.

Figure 4:
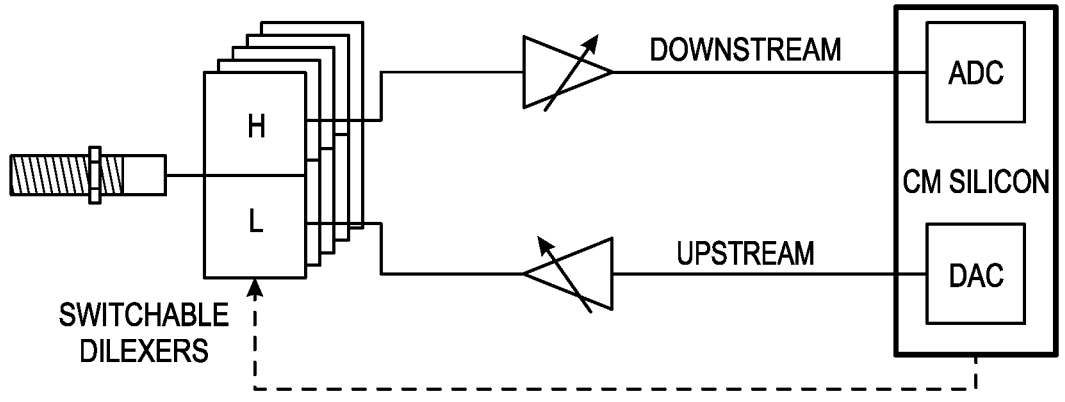
FIG. 4 is a block diagram of a cable modem upon which an embodiment of the invention may be practiced.

FIG. 4 is a block diagram of a cable modem (CM) upon which an embodiment of the invention may be practiced. The CM depicted in FIG. 4 is similar to a traditional cable modem but for the presence of the switchable diplexers in lieu of fixed-split diplexers. In addition, unlike the prior art slow process of selecting a diplexer, which is a static configuration requiring the cable modem to be rebooted after a change in diplexer selection, the CM of an embodiment dynamically controls the diplexer switching, and is required in the performance of step 120 to use the frequency spectrum in accordance with the new active spectrum configuration by transmitting upstream data and receiving downstream data using the new active spectrum configuration after a short period of adjustment and without a reboot. The cable modem (CM) of FIG. 4 may be instructed by an entity upstream, such as a CMTS. The switchable diplexer selection made in the performance of step 120, as well as any other associated operation may be implemented in a very short time frame while the cable modem continues to receive and transmit data in unaffected channels. The cable modem of an embodiment prepares channels which were usable before changing the selected diplexer but unusable after the change to be dormant, and reacquires channels which were unusable before changing the selected diplexer but usable after the change immediately when they are passed by the changed diplexer.

The devices depicted in FIGS. 2-4 serve as concrete examples of the types of devices which may perform the steps of FIG. 1 in accordance with an embodiment. A device of an embodiment may comprise a single northbound port with configured switchable frequency filters and may lack a southbound port with switchable frequency filters. As another example, a device of an embodiment may lack a northbound port with configured switchable frequency filters, and may comprise one or more southbound ports that each has a separate set of configured switchable frequency filters. As another example, a device of an embodiment may comprise a single northbound port with configured switchable frequency filters and may comprise one or more southbound ports that each has a separate set of configured switchable frequency filters.

Figure 5:
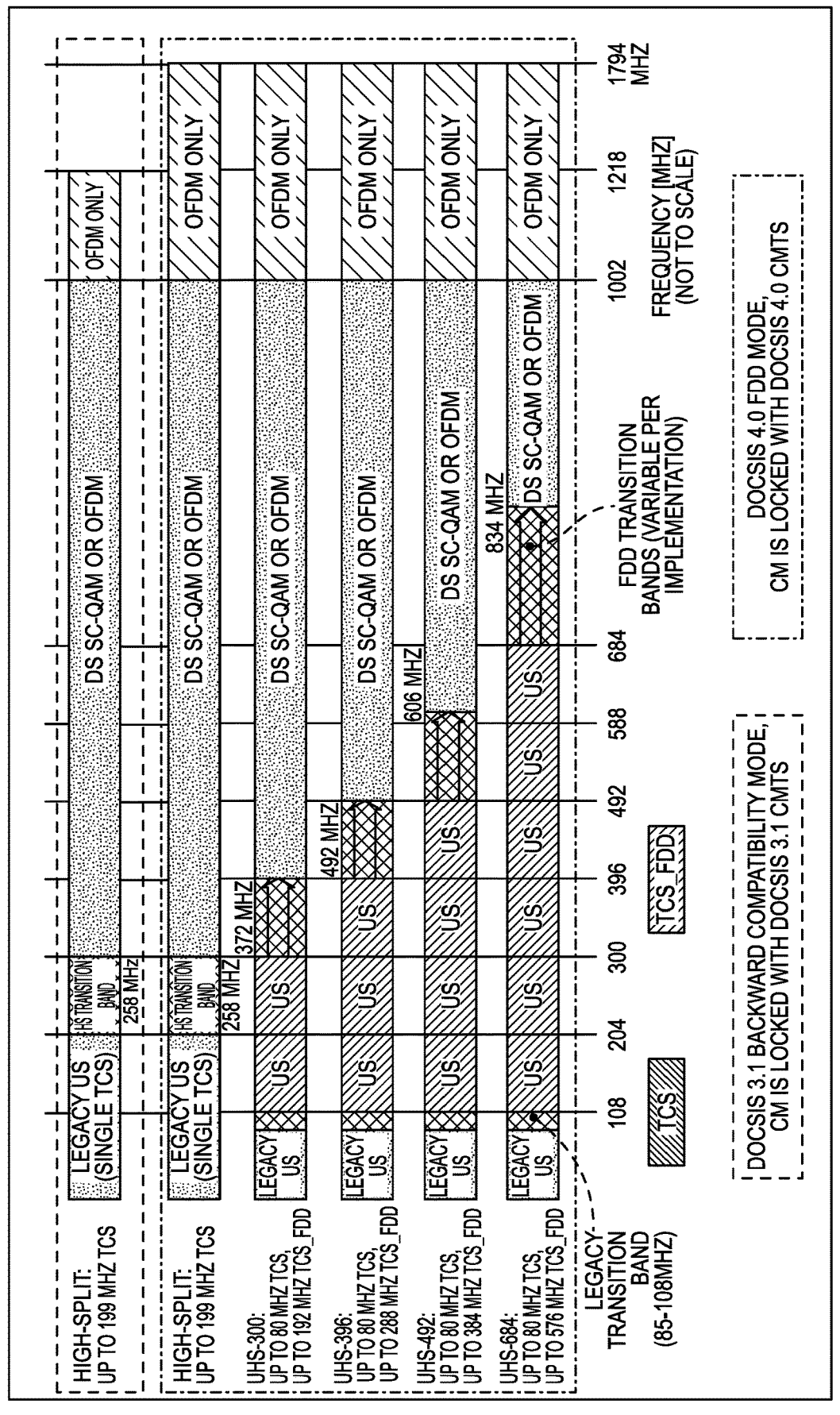
FIG. 5 is an illustration of six different preestablished spectrum configurations between upstream and downstream communications which may be utilized by embodiments of the invention.

FIG. 5 is an illustration of six different preestablished spectrum configurations between upstream and downstream communications which may be utilized by embodiments of the invention. The preestablished spectrum configurations shown in FIG. 5 correspond to DOCSIS 4.0 FDD spectrum configurations intended for static spectrum allocations, but the same set of preestablished spectrum configurations may be used in an embodiment of FDS. Not all of the preestablished spectrum configurations shown in FIG. 5 need be supported, indeed, all of the preestablished spectrum configurations shown in FIG. 5 are optional and are merely exemplary of preestablished spectrum configurations that may be used. Embodiments of the invention may operate with a variety of preestablished spectrum configurations, and it is suggested that the set of preestablished spectrum configurations to be employed may be optimized as per the access system requirements.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An article of manufacture for dynamically adjusting how a frequency spectrum is allocated between upstream and downstream communications on an access network, comprising:

a device receiving, over the access network from an upstream direction, an instruction to dynamically adopt a new active frequency duplexing division (FDD) spectrum configuration from a set of preestablished FDD spectrum configurations, wherein each of said preestablished FDD spectrum configurations allocates the frequency spectrum differently between upstream traffic and downstream traffic;

the device processing the instruction by selecting one or more switchable diplexers to adopt said new active FDD spectrum configuration; and upon adopting said new active FDD spectrum configuration, the device ceasing to use a prior FDD spectrum configuration and henceforth using said frequency spectrum in accordance with said new active FDD spectrum configuration.

2. The article of manufacture of claim 1, wherein said device is a cable modem or a wireless modem, and wherein the device uses the frequency spectrum in accordance with said new active FDD spectrum configuration by transmitting upstream data and receiving downstream data using said new active FDD spectrum configuration.

3. The article of manufacture of claim 2, wherein the device comprises a single northbound port with configured switchable frequency filters, and lacks a southbound port with switchable frequency filters.

4. The article of manufacture of claim 1, wherein said device is an HFC node, a fixed wireless access point, or a cellular base station, and wherein the device uses the frequency spectrum in accordance with said new active FDD spectrum configuration by communicating with one or more downstream devices.

5. The article of manufacture of claim 4, wherein the device lacks a northbound port with configured switchable frequency filters, and comprises one or more southbound ports that each has a separate set of configured switchable frequency filters.

6. The article of manufacture of claim 1, wherein said device is an HFC amplifier or a wireless relay, and wherein the device uses the frequency spectrum in accordance with said new active FDD spectrum configuration by propagating an amplified version of upstream traffic and downstream traffic.

7. The article of manufacture of claim 6, wherein the device comprises a single northbound port with configured switchable frequency filters and comprises one or more southbound ports that each has a separate set of configured switchable frequency filters.

8. The article of manufacture of claim 1, wherein the instruction received by the device specifies a time at which the device is to dynamically adopt the new active FDD spectrum configuration, and wherein the device adopts the new active FDD spectrum configuration at said time.

9. One or more non-transitory computer-readable storage mediums storing one or more sequences of instructions for dynamically adjusting how a frequency spectrum is allocated between upstream and downstream communications on an access network, which when executed, cause:

a device receiving, over the access network from an upstream direction, an instruction to dynamically adopt a new active frequency duplexing division (FDD) spectrum configuration from a set of preestablished FDD spectrum configurations, wherein each of said preestablished FDD spectrum configurations allocates the frequency spectrum differently between upstream traffic and downstream traffic;

the device processing the instruction by selecting one or more switchable diplexers to adopt said new active FDD spectrum configuration; and upon adopting said new active FDD spectrum configuration, the device ceasing to use a prior FDD spectrum configuration and henceforth using said frequency spectrum in accordance with said new active FDD spectrum configuration.

10. The one or more non-transitory computer-readable storage mediums of claim 9, wherein said device is a cable modem or a wireless modem, and wherein the device uses the frequency spectrum in accordance with said new active FDD spectrum configuration by transmitting upstream data and receiving downstream data using said new active FDD spectrum configuration.

11. The one or more non-transitory computer-readable storage mediums of claim 9, wherein the device comprises a single northbound port with configured switchable frequency filters, and lacks a southbound port with switchable frequency filters.

12. The one or more non-transitory computer-readable storage mediums of claim 9, wherein said device is an HFC node, a fixed wireless access point, or a cellular base station, and wherein the device uses the frequency spectrum in accordance with said new active FDD spectrum configuration by communicating with one or more downstream devices.

13. The one or more non-transitory computer-readable storage mediums of claim 12, wherein the device lacks a northbound port with configured switchable frequency filters, and comprises one or more southbound ports that each has a separate set of configured switchable frequency filters.

14. The one or more non-transitory computer-readable storage mediums of claim 9, wherein said device is an HFC amplifier or a wireless relay, and wherein the device uses the frequency spectrum in accordance with said new active FDD spectrum configuration by propagating an amplified version of upstream traffic and downstream traffic.

15. The one or more non-transitory computer-readable storage mediums of claim 9, wherein the device comprises a single northbound port with configured switchable frequency filters and comprises one or more southbound ports that each has a separate set of configured switchable frequency filters.

16. The one or more non-transitory computer-readable storage mediums of claim 9, wherein the instruction received by the device specifies a time at which the device is to dynamically adopt the new active FDD spectrum configuration, and wherein the device adopts the new active FDD spectrum configuration at said time.

* * * * *